United States Patent
Fujita

(10) Patent No.: US 7,929,488 B2
(45) Date of Patent: Apr. 19, 2011

(54) MOBILE TERMINAL AND COMMUNICATION SYSTEM

(75) Inventor: Masanori Fujita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 624 days.

(21) Appl. No.: 11/613,604

(22) Filed: Dec. 20, 2006

(65) Prior Publication Data
US 2007/0140198 A1 Jun. 21, 2007

(30) Foreign Application Priority Data

Dec. 21, 2005 (JP) ................. P2005-368438
Dec. 7, 2006 (JP) ................. P2006-330923

(51) Int. Cl.
*H04W 4/00* (2009.01)
*H04M 1/725* (2006.01)
*H04M 1/00* (2006.01)

(52) U.S. Cl. .............. 370/328; 455/412.1; 455/550.1

(58) Field of Classification Search ............ 455/412.1, 455/414.2–414.4, 456; 370/310, 328
See application file for complete search history.

(56) References Cited

U.S. PATENT DOCUMENTS

| | | | |
|---|---|---|---|
| 6,526,335 B1 * | 2/2003 | Treyz et al. ............. 701/1 |
| 2002/0107941 A1 * | 8/2002 | Katz et al. ............. 709/219 |
| 2002/0132616 A1 * | 9/2002 | Ross et al. ............. 455/419 |
| 2003/0087646 A1 * | 5/2003 | Funato et al. ............. 455/456 |
| 2004/0249663 A1 * | 12/2004 | Shishido ............. 705/1 |
| 2006/0135190 A1 * | 6/2006 | Drouet et al. ............. 455/514 |
| 2006/0264197 A1 * | 11/2006 | Mahini et al. ............. 455/343.5 |
| 2006/0277277 A1 * | 12/2006 | Landschaft et al. ............. 709/220 |

FOREIGN PATENT DOCUMENTS

| | | |
|---|---|---|
| JP | 2000-270249 | 9/2000 |
| JP | 2003-289491 | 10/2003 |
| JP | 2005-11148 | 1/2005 |
| WO | WO 01/74046 A1 | 10/2001 |

* cited by examiner

*Primary Examiner* — Michael T Thier
(74) *Attorney, Agent, or Firm* — Oblon, Spivak, McClelland, Maier & Neustadt, L.L.P.

(57) ABSTRACT

A mobile terminal and a communication system that can prevent user errors in transferring data are provided. In the communication system related to the present invention, the mobile terminal decides on a transfer of the video data from the storage device when a predetermined transfer condition has been satisfied. Thus, any decisions or specified operations are not required of the user at the time of the transfer, therefore, the transfer of the video data from the storage device to the mobile terminal is carried out without the user being especially cognizant of the operation. Accordingly, the communication system can prevent a situation in which the user forgets to transfer the video data to the mobile terminal due to carelessness.

19 Claims, 5 Drawing Sheets

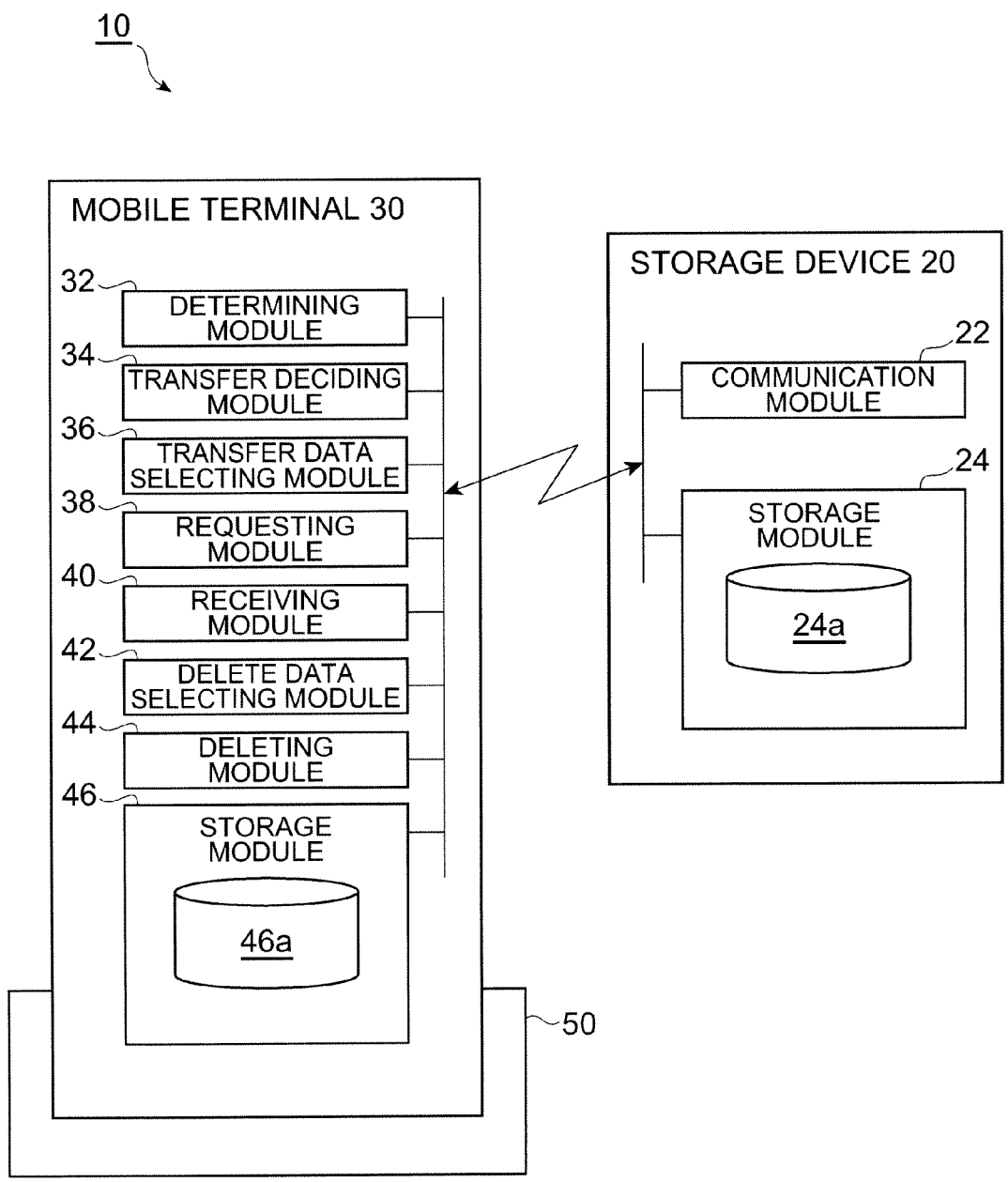

*Fig.2*

| VIDEO NAME | DATE AND TIME OF PRODUCTION | CATEGORY | VOLUME OF DATA | TRANSFER REQUEST PRESENT? |
|---|---|---|---|---|
| AAAAA | Yyyy/mm/dd | NEWS | 100MB | NO |
| BBBB | Yyyy/mm/dd | DRAMA | 150MB | YES |
| CCC | Yyyy/mm/dd | MOTION PICTURE | 120MB | NO |
| DDD | Yyyy/mm/dd | MOTION PICTURE | 100MB | YES |
| EE | Yyyy/mm/dd | VARIETY SHOW | 100MB | NO |
| FFFF | Yyyy/mm/dd | VARIETY SHOW | 100MB | NO |
| GGG | Yyyy/mm/dd | VARIETY SHOW | 100MB | NO |
| HH | Yyyy/mm/dd | VARIETY SHOW | 100MB | NO |
| II | Yyyy/mm/dd | VARIETY SHOW | 200MB | NO |
| JJJJ | Yyyy/mm/dd | VARIETY SHOW | 200MB | NO |
| KKKKK | Yyyy/mm/dd | DRAMA | 200MB | NO |
| ⋮ | ⋮ | ⋮ | ⋮ | ⋮ |

Fig.3

| VIDEO NAME | DATE AND TIME OF TRANSFER | DATE AND TIME OF PRODUCTION | CATEGORY | VOLUME OF DATA | IN-USE FLAG |
|---|---|---|---|---|---|
| AAAAA | Yyyy/mm/dd | Yyyy/mm/dd | NEWS | 100MB | YES |
| BBBB | Yyyy/mm/dd | Yyyy/mm/dd | DRAMA | 150MB | NO |
| CCC | Yyyy/mm/dd | Yyyy/mm/dd | MOTION PICTURE | 120MB | NO |
| ... | ... | ... | ... | ... | ... |

MOBILE TERMINAL AND COMMUNICATION SYSTEM

BACKGROUND OF THE INVENTION

1. Field of the Invention

The present invention relates to a mobile terminal to which data stored in a storage device is transferred and to a communication system.

2. Description of the Related Art

In recent years storage devices for storing video data such as, for example, HDRs (hard disk video recorders) have come onto the market for home use. Users can now view a video stored in such a storage device while away from home using their own mobile terminal (for example, a mobile telephone or the like).

At this point, methods that can be considered for transferring video data from a storage device to a mobile terminal are a method using a storage media such as flash memory and a method that is carried out through communication between the storage device and the mobile terminal.

When the above two methods are compared it is found that storage media is greatly limited by size and weight requirements for portability, energy consumption and memory capacity, and the data volumes of video data are large in comparison to text data or music data so that a large number of files cannot be stored, thus the method in which data transfer is carried out through communication is preferred to the method using a storage media.

SUMMARY OF THE INVENTION

However, even in the method in which data transfer is carried out through communication, when decisions or specified operations are required of the user at the time of data transfer, through carelessness it is easy for the user to forget to transfer the data to be stored to the mobile terminal. Technology that prevents this type of error in transferring data is desired.

An object of the present invention is to solve the above problems by providing a mobile terminal and communication system that can prevent user errors in transferring data.

The communication system relating to the present invention is one in which video data is transferred through wireless communication from a storage device storing the video data to a mobile terminal. The mobile terminal comprises determining module for determining whether a predetermined transfer condition has been satisfied, transfer deciding module for deciding on a transfer of the video data from the storage device when the determining module determines that the transfer condition has been satisfied, and requesting module for transmitting a transfer request for the video data to the storage device when the transfer deciding module decides on the transfer of the video data.

In this communication system, the mobile terminal decides for the storage device to transfer the video data when the predetermined transfer condition has been satisfied. Hence, any decisions or specified operations are not required of the user at the time of transfer, therefore, the transfer of the video data from the storage device to the mobile terminal is carried out without the user being especially cognizant of the operation. Thus, this communication system can prevent a situation in which the user forgets to transfer the video data to the mobile terminal due to carelessness.

Note that some preferable transfer conditions are whether the mobile terminal is being recharged, whether it gets to the predetermined time, whether the predetermined duration of time has passed, whether the communication has been established between the storage device and the mobile terminal, whether the mobile terminal received predetermined information from the storage device, and the like.

Additionally, a plurality of video data items are stored in the storage device so as to be distinguishable, and the mobile terminal further comprises transfer data selecting module for selecting the video data transferred from the storage device from among the plurality of video data items stored in the storage device on the basis of a predetermined selection condition. The requesting module may also transmit a transfer request for the video data selected by the transfer data selecting module when the transfer deciding module decides to transfer the video data. In this case, any decisions or specified operations are not required of the user and the only video data satisfying the selection condition is transferred to the mobile terminal.

Preferably the communication system further comprises deleting module for deleting the video data from a storage module of the mobile terminal, which stores the video data transferred from the storage device.

Preferably, a plurality of video data items are stored in the storage module so as to be distinguishable and the mobile terminal further comprises delete data selecting module for selecting the video data to be deleted among the plurality of video data items stored in the storage module on the basis of a predetermined selection condition, and the deleting module deletes the video data selected by the delete data selecting module. In this case, any decisions or specified operations are not required of the user and the only video data satisfying the selection condition is deleted from the storage module.

The mobile terminal relating to the present invention is one that is applied to a communication system for transfer of video data through wireless communication from a storage device storing the video data to a mobile terminal and comprises determining module for determining whether a predetermined transfer condition has been satisfied, transfer deciding module for deciding on a transfer of the video data from the storage device when the determining module determines that the transfer condition has been satisfied, and requesting module for transmitting a transfer request for the video data to the storage device when the transfer deciding module decides on the transfer of the video data.

In this mobile terminal, the decision to transfer the video data from the storage device is decided when the predetermined transfer condition has been satisfied. Hence, any decisions or specified operations are not required of the user at the time of transfer, therefore, the transfer of the video data from the storage device to the mobile terminal is carried out without the user being especially cognizant of the operation. Thus this mobile terminal can prevent a situation in which the user forgets to transfer the video data to the mobile terminal due to carelessness.

The communication system related to the present invention is one in which digital content are transferred through wireless communication from a storage device storing the digital content to a mobile terminal. The mobile terminal comprises determining module for determining whether a predetermined transfer condition has been satisfied, transfer deciding module for deciding on a transfer of the digital content from the storage device when the determining module determines that the transfer condition has been satisfied, and requesting module for transmitting a transfer request for the digital content to the storage device when the transfer deciding module decides on a transfer of the digital content.

In this communication system, the mobile terminal decides for the storage device to transfer the digital content when the predetermined transfer condition has been satisfied. Hence, any decisions or specified operations are not required of the user at the time of transfer, therefore, the transfer of the digital content from the storage device to the mobile terminal is carried out without the user being especially cognizant of the operation. Thus, this communication system can prevent a situation in which the user forgets to transfer the digital content to the mobile terminal due to carelessness.

BRIEF DESCRIPTION OF THE DRAWINGS

FIG. 1 is a block configuration drawing of the communication system related to an embodiment of the present invention;

FIG. 2 is a drawing showing a database of the video data stored in the storage device that is shown in FIG. 1;

FIG. 3 is a drawing showing a database of the video data stored in the mobile terminal that is shown in FIG. 1;

DESCRIPTION OF THE PREFERRED EMBODIMENTS

Figure 4:
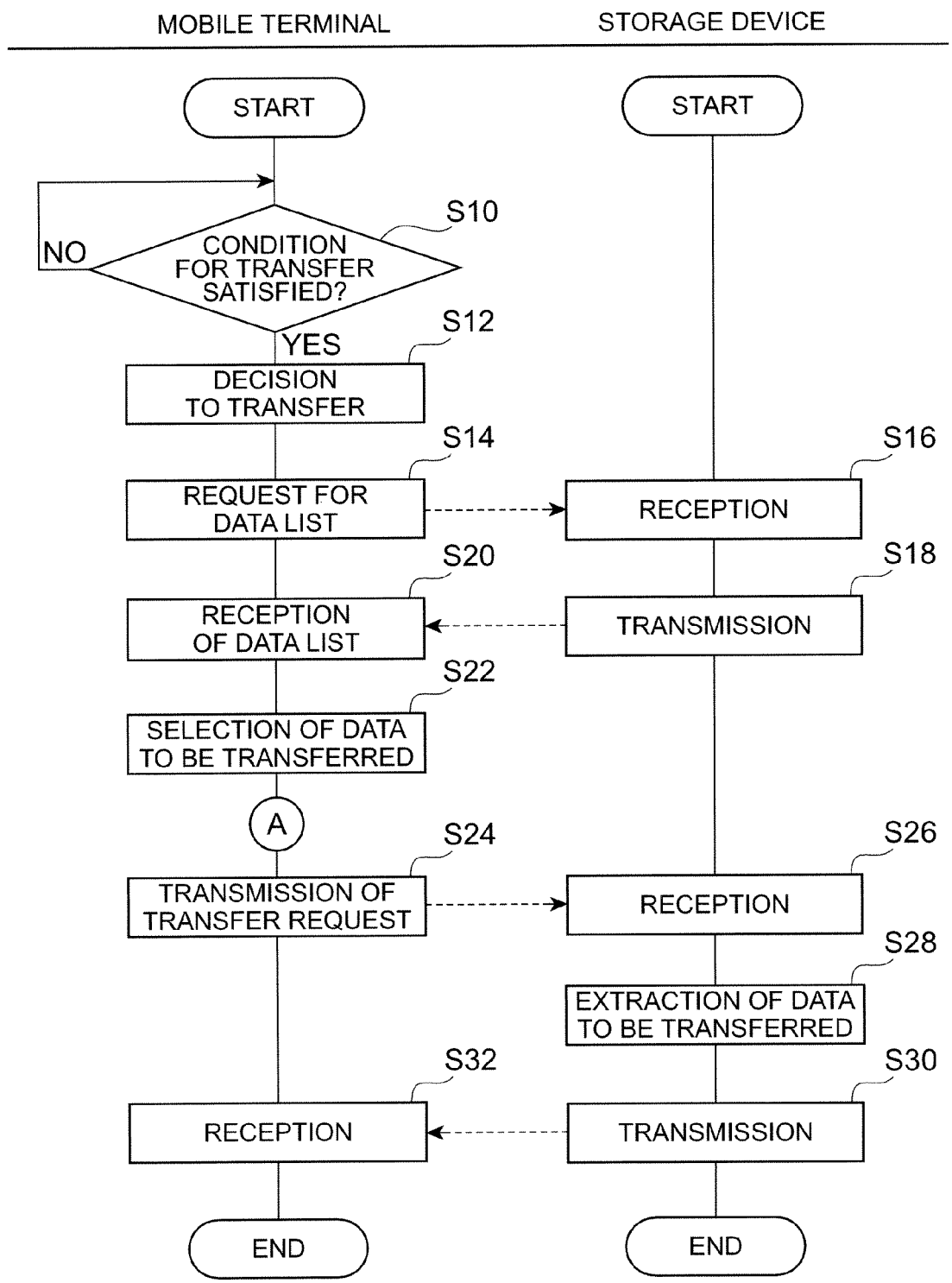
FIG. 4 is a flowchart showing the process of video data being transferred from the storage device to the mobile terminal.

Below a detailed explanation of what is considered the best mode to implement the present invention is given with reference to the attached drawings. Note that identical or equivalent members have an identical reference number and that duplicate explanations are omitted.

FIG. 1 is a drawing showing a communication system related to an embodiment of the present invention. As shown in FIG. 1 a communication system 10 related to an embodiment of the present invention comprises a storage device 20 and a mobile terminal 30. This communication system 10 is configured to make possible transfer of video data stored in the storage device 20 to the mobile terminal 30 through a wireless LAN.

The storage device 20 is a large capacity storage device housing a hard disk and has a communication function through a wireless LAN. This storage device 20 has as its main physical constituent members a CPU (central processing unit), memory, a hard disk, a wireless communication device and the like. As its functional constituent members it has a communication module 22 and a storage module 24.

A database 24a of the video data (the video file) is stored in the storage module 24. A plurality of video data files (video data items) are stored in the database 24a in a state in which the data is distinguishable, as shown in FIG. 2. Here, FIG. 2 shows the video data stored in the database 24a. The database is configured to make it easy to distinguish and select, sort and search through video files through attribute information (more specifically, video name, date and time of production, category, volume of data and the presence or lack of a transfer request) attached to each video data file.

The communication module 22 carries out the transmission of various types of information with the mobile terminal 30. More specifically, the communication module 22, for example, transmits the video data from the storage module 24 to the mobile terminal 30, and receives a transfer request to be explained below from the mobile terminal 30. Note that as required the communication module 22 may transmit the video data with information such as that shown below attached to the mobile terminal 30.

(1) A list of all the video data stored in the storage device
(2) The date and time of transfer
(3) Distinguishing information for the storage device (name, ID number, manufacture number, and the like)
(4) The modification date of the video data (broadcast date, storage date, and the like)
(5) Summary information of the video data (obtained from metadata, EPG and the like)
(6) Viewing state of the video data (whether the video data is being viewed at home, the portion of viewing that is complete)

Note the video data list mentioned above may also include the below modes.

(1-1) Ability to determine whether each video data is already stored in the mobile terminal
(1-2) The date and time the list was produced
(1-3) Video data not transferred to the mobile terminal and their respective equipment names where they are stored (name, manufacture number, MAC address)
(1-4) Connection information for viewing each video data not transferred to the mobile terminal away from home (access URL, IP address, query and the like assigned to each video data)

The mobile terminal 30 is a mobile telephone having a wireless LAN communication function, and can be attached to and removed from a specialized cradle 50. This mobile terminal 30 has as its main physical constituent members a CPU (central processing unit), memory, sound processing devices such as a microphone and a speaker, a wireless communication device, a liquid crystal panel, a push button and the like. And the mobile terminal 30 has as its functional constituent members a determining module 32, a transfer deciding module (transfer module) 34, a transfer data selecting module 36, a requesting module 38, a receiving module 40, a delete data selecting module 42, a deleting module 44 and a storage module 46.

A database 46a of the video data transferred from the storage device 20 is stored in the storage module 46. A plurality of video data files are stored in the database 46a in a state in which they can be distinguished, as shown in FIG. 3. Here, FIG. 3 shows the video data stored in the database 46a. The database is configured to make it easy to distinguish and select, sort and search through video files through attribute information (more specifically, video name, date and time of transfer, date and time of production, category, volume of data and in-use flag) attached to each video data file.

The determining module 32 determines whether the mobile terminal 30 is being charged, more specifically whether the mobile terminal 30 is set in the cradle 50, which is connected to a home use power source. Here the determining of "whether the mobile terminal 30 is being charged" by the determining module 32 is a transfer condition in the present invention. Note that detection of the charging state of the mobile terminal 30 is carried out using well-known technology.

The transfer deciding module 34 decides for the storage device 20 to transfer video data when the above determining module 32 determines that "the mobile terminal 30 is being charged" (more specifically, when the determining module 32 determines that the transfer condition is satisfied).

The transfer data selecting module 36 selects the video data to be transferred from the storage device 20 to the mobile terminal 30. Thus, the transfer data selecting module 36 requests a data list from the storage device 20. This data list is substantially the same as the content of the database 24a of the storage device 20 shown in FIG. 2, and shows attribute information for each video data file. The transfer data selecting module 36 selects video data for transfer to the mobile terminal 30 on the basis of predetermined selection conditions with reference to the data list received from the storage device 20.

The selection conditions are for example,
(a) The video data has been ordered by the user
(b) The video data matches the user's preferences, determined on the basis of history information of the video data viewed by the user
(c) The video data has a recent date and time of production
(d) When the video data category is a series such as drama, the video data in which the video data of its prior episode is being viewed
(e) The video data is of a smaller volume than the unused volume in the storage module 46 in the mobile terminal 30
(f) The video data which is the continuation of the video data that the user is watching at home.

The transfer data selecting module 36 uses these selection conditions alone or in combination and selects video data to be transferred to the mobile terminal 30 from among a plurality of video data files stored in the storage device 20.

The requesting module 38 transmits a transfer request, which includes information to specify the video data selected by the transfer data selecting module 36, to the storage device 20 when the transfer of video data has been decided on by the transfer deciding module 34.

The receiving module 40 receives video data transferred form the storage device 20. Additionally this receiving module 40 adds the received video data to the database 46a in the storage module 46.

The delete data selecting module 42 selects video data to be deleted from among the plurality of video data files stored in the storage module 46 of the mobile terminal 30 on the basis of predetermined selection conditions.

The selection conditions are for example
(a) The video data has already been viewed by the user
(b) The video data has not been viewed by the user during a fixed time period
(c) Related new video data (so-called latest version, revised version, updated version) has been transferred from the storage device to the storage module of the mobile terminal
(d) The video data has been completely viewed by the user at home.

The delete data selecting module 42 uses these selection conditions alone or in combination and selects the video data to be deleted from among the plurality of video data files stored in the storage module 46 of the mobile terminal 30.

The deleting module 44 deletes the video data selected by the delete data selecting module 42 at a predetermined timing (a timing indicated by the user or a predetermined time or the like).

Below the process in which video data is transferred from the storage device 20 to the mobile terminal 30 is explained in reference to the flowchart shown in FIG. 4.

The determining module 32 of the mobile terminal 30 repeatedly determines a transfer condition (whether the mobile terminal 30 is being charged) until the transfer condition has been satisfied (step 10). When the determining module 32 determines that the transfer condition has been satisfied the transfer deciding module 34 decides for the storage device 20 to transfer video data (step 12) and the transfer data selecting module 36 selects video data to be transferred from the storage device 20 to the mobile terminal 30.

Specifically, the transfer data selecting module 36 transmits a request for the data list to the storage device 20 (step 14), the communication module 22 of the storage device 20 receives this request (step 16) and transmits the data list of the video data stored in the storage module 24 to the mobile terminal 30 (step 18). The transfer data selecting module 36 receives the data list sent from the storage device 20 (step 20) and, in reference to this list selects the video data that satisfies the selection condition (step 22).

As shown above, when the transfer data selecting module 36 selects the video data to be transferred from the storage device 20 to the mobile terminal 30, the transfer data selecting module 36 transmits a transfer request, containing information that specifies that video data, to the storage device 20 (step 24).

Note that before the transfer request is transmitted from the mobile terminal 30 to the storage device 20 information as shown below may be transmitted from the mobile terminal 30 to the storage device 20.
(1) A list of all the video data stored in the mobile terminal
(2) A list of all the video data already viewed in the mobile terminal
(3) The portion of viewing that has been completed in the video data that is currently being viewed in the mobile terminal
(4) The date and time of transfer of each stored video data file
(5) The amount of time that has passed since each stored video data file was stored
(6) A user rating (ranking, data concerning preferences and the like) of each stored video data file When the storage device 20 receives a transfer request from the mobile terminal 30 through the communication module 22 (step 26) it extracts the video data, selected by the transfer data selecting module 36 on the basis of that transfer request, from the database 24a of the storage portion 24 (step 28) and transmits that video data to the mobile terminal 30 (step 30).

The transfer process of the video data is completed when the video data sent from the storage device 20 is received by the receiving module 40 of the mobile terminal 30 (step 32). Note that the video data received from the storage device 20 is added as appropriate by the receiving module 40 to the database 46a of the storage module 46.

As explained in detail above, in the communication system 10, when the predetermined transfer condition has been satisfied, the transfer deciding module 34 of the mobile terminal 30 decides for the storage device 20 to transfer the video data. Thus any decisions or specified operations are not required of the user at the time of the transfer of the video data. Therefore, the transfer of the video data from the storage device 20 to the mobile terminal 30 is carried out without the user being especially cognizant of the operation. Accordingly, the communication system 10 can prevent a situation in which the user forgets to transfer the video data to the mobile terminal 30 (i.e. a transfer error) due to carelessness.

Note that the storage device 20 is generally disposed indoors, however the timing in which the mobile terminal 30 makes transfer requests to the storage device 20 may be both when the mobile terminal 30 is in the same room as the storage device 20 or when the mobile terminal 30 is outside the room. When the mobile terminal 30 is in the same room as the storage device 20 a near field wireless communication system (near field wireless LAN or the like) is used and when the mobile terminal 30 is outside the room a wide area wireless communication system (wide area wireless LAN, WCDMA, WMA X or the like) is used. Since the transfer request and the data transfer (i.e. download) are carried out when the mobile terminal 30 is outside the room in which the storage device 20 is located, it is no longer necessary for the user of the mobile terminal 30 to transport the mobile terminal 30 to the location in which the storage device 20 is disposed to transfer the video data, thus the data transfer can be carried out more easily and conveniently.

Additionally if the data stored on the storage device 20 and transferred to the mobile terminal 30 is digital content data, other digital content (for example, image data, music data and the like), not limited to video data, may also be transferred.

Note that in the embodiment mentioned above the transfer condition "whether the mobile terminal 30 is being charged" was used as an example in the explanation, however, as shown below the transfer condition may be changed as appropriate to another transfer condition.

More specifically, the transfer conditions are for example:
(a) A predetermined time set in advance by the user has been reached
(b) A low frequency of use time slot determined on the basis of the processing or history of communication of the mobile terminal has been reached
(c) A fixed duration of time has passed since a predetermined process performed by the mobile terminal
(d) A predetermined process in the mobile terminal is within a fixed duration of time
(e) The communication is within a fixed duration of time
(f) Communication between the storage device and the mobile terminal has been established
(g) The mobile terminal receives predetermined information from the storage system.

The transfer deciding module 34 can as required use these transfer conditions alone or in combination. Note that the establishment of communication in (f) can be determined using a MAC address, a SSID, an IP address, a GW address, a DNS address or the like. Additionally in the communication in (f) it is also possible to use DLNA (Digital Living Network Alliance) technology or UPnP (Universal Plug and Play) technology. In this case when the mobile terminal is connected for communication with a DLNA registered in advance or a household LAN, communication is established between the storage device and the mobile terminal.

Figure 5:
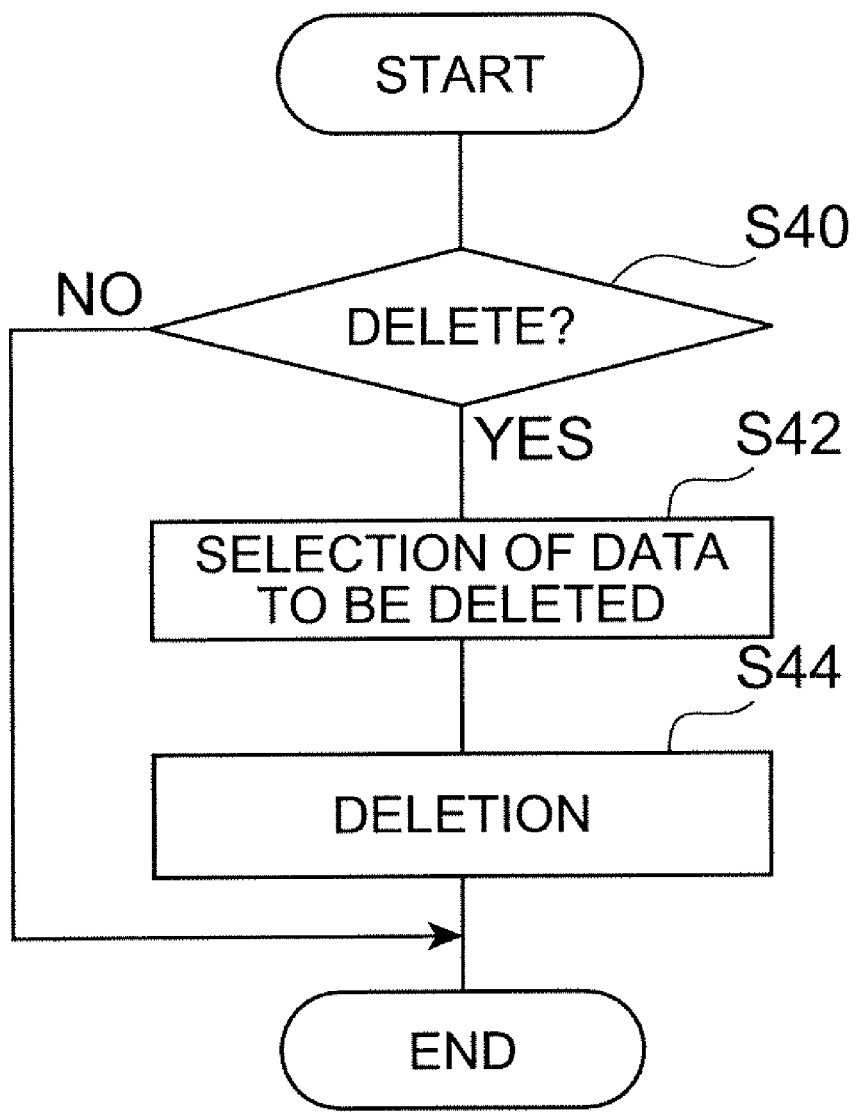
FIG. 5 is a flowchart showing the process of video data stored in the storage module of the mobile terminal being deleted.

Next the process in which video data stored in the storage module 46 of the mobile terminal 30 is deleted is explained with reference to the flowchart shown in FIG. 5.

The mobile terminal 30 deletes video data stored in the storage module 46 at a predetermined timing (for example the A member shown in FIG. 4). When deleting is carried out (step 40) first the delete data selecting module 42 selects the video data to be deleted (step 42). Then the deleting module 44 deletes selectively the video data selected by the delete data selecting module 42 from the storage module 46 (step 44).

Since deletion of video data in the storage module 46 is carried out in this manner, decisions or specified operations are not required of the user in order to delete video data and it is made possible for only video data satisfying the selection condition to be deleted from the storage module 46.

The present invention is not limited to the embodiment described above and can be implemented with various modifications. For example, the mobile terminal is not limited to a mobile telephone but may also be a PDA or portable game device, a personal computer or the like. Additionally, the storage system is not limited to one with a hard disk installed but may be any high capacity storage device that can store video data. Furthermore, the wireless communication system is not limited to a wireless LAN but may be another system. The headings in the databases of the storage device and the mobile terminal may as required be appropriately modified or increased or decreased.

Additionally, in the embodiment described above an example was described of the storage device being a high capacity storage device having a wireless communication function, however, the storage device may also be formed from a plurality of devices that include a separate wireless base station and a high capacity storage device (for example a storage server). In this case the wireless base station and high capacity storage device mentioned above would be connected by a household LAN. Well-known communication technology (Ethernet, Bluetooth, UWB, WLAN or the like) may be used in the household LAN.

The present invention provides a mobile terminal and communication system that can prevent user errors in transferring data.

What is claimed is:

1. A communication system in which digital content is transferred through wireless communication from a storage device storing the digital content, to a mobile terminal, wherein the mobile terminal comprises:
a determining module configured to determine whether one or plural predetermined transfer conditions have been satisfied;
a transfer deciding module configured to automatically decide on a transfer of the digital content from the storage device, without user's decision, when the determining module determines that the transfer conditions have been satisfied; and
a requesting module configured to transmit a transfer request for the digital content to the storage device, without user operation, when the transfer deciding module decides on the transfer of the digital content, wherein
a plurality of the digital content items are stored in the storage device so that the plurality of the digital content items are distinguishable,
the mobile terminal further comprises transfer data selecting module configured to select the digital content to be transferred from the storage device from among the plurality of digital content items stored in the storage device on the basis of a predetermined selection condition and without receiving a user input identifying the selected digital content,
the requesting module transmits a transfer request for the digital content selected by the transfer data selecting module when the transfer of the digital content has been decided on by the transfer deciding module, and
the predetermined selection condition is that the selected digital content is a continuation of digital content that the user is accessing on a device different from the mobile terminal.

2. The communication system according to claim 1, wherein the transfer condition is that the mobile terminal is being charged.

3. The communication system according to claim 1, wherein the transfer condition is that a predetermined time has been reached.

4. The communication system according to claim 1, wherein the transfer condition is that a predetermined duration of time has passed.

5. The communication system according to claim 1, wherein the transfer condition is that communication has been established between the storage device and the mobile terminal.

6. The communication system according to claim 1, wherein the transfer condition is that the mobile terminal has received predetermined information from the storage device.

7. The communication system according to claim 1, further comprising:
   a deleting module configured to delete the digital content from a storage module of the mobile terminal which stores the digital content transferred from the storage device.

8. The communication system according to claim 7, wherein a plurality of the digital content items are stored in the storage module so that the plurality of the digital content items are distinguishable,
   the mobile terminal further comprises delete data selecting module configured to select the digital content to be deleted from among the plurality of digital content items stored in the storage module on the basis of a predetermined selection condition, and
   the deleting module deletes the digital content selected by the delete data selecting module.

9. The communication system according to claim 1, wherein the predetermined selection condition includes that the selected digital content has been ordered by the user.

10. The communication system according to claim 1, wherein the predetermined selection condition includes that the selected digital content matches the user's preferences determined on the basis of history information corresponding to the user.

11. The communication system according to claim 1, wherein the predetermined selection condition includes that the selected digital content has a recent date and time of production.

12. The communication system according to claim 1, wherein the predetermined selection condition includes that the selected digital content is related to digital content currently being reproduced by the mobile terminal.

13. The communication system according to claim 1, wherein the predetermined selection condition includes that the selected digital content is smaller in size than a current unused portion of a storage module of the mobile terminal.

14. A mobile terminal applied to a communication system for transfer of digital content through wireless communication from a storage device in which the digital content is stored, to the mobile terminal, wherein the mobile terminal comprises:
   a determining module configured to determine whether one or plural predetermined transfer conditions have been satisfied;
   a transfer deciding module configured to automatically decide on a transfer of the digital content from the storage device, without user's decision, when the determining module determines that the transfer conditions have been satisfied; and
   a requesting module configured to transmit a transfer request for the digital content to the storage device, without user operation, when the transfer deciding module decides on the transfer of the digital content, wherein
   a plurality of the digital content items are stored in the storage device so that the plurality of the digital content items are distinguishable,
   the mobile terminal further comprises a transfer data selecting module configured to select the digital content to be transferred from the storage device from among the plurality of digital content items stored in the storage device on the basis of a predetermined selection condition and without receiving a user input identifying the selected digital content,
   the requesting module transmits a transfer request for the digital content selected by the transfer data selecting module when the transfer of the digital content has been decided on by the transfer deciding module, and
   the predetermined selection condition includes that the selected digital content is a continuation of digital content that the user is accessing on a device different from the mobile terminal.

15. The mobile terminal according to claim 14, wherein the predetermined selection condition includes that the selected digital content has been ordered by the user.

16. The mobile terminal according to claim 14, wherein the predetermined selection condition includes that the selected digital content matches the user's preferences determined on the basis of history information corresponding to the user.

17. The mobile terminal according to claim 14, wherein the predetermined selection condition includes that the selected digital content has a recent date and time of production.

18. The mobile terminal according to claim 14, wherein the predetermined selection condition includes that the selected digital content is related to digital content currently being reproduced by the mobile terminal.

19. The mobile terminal according to claim 14, wherein the predetermined selection condition includes that the selected digital content is smaller in size than a current unused portion of a storage module of the mobile terminal.

* * * * *